United States Patent [19]

Le Foll et al.

[11] 4,391,708
[45] Jul. 5, 1983

[54] APPARATUS FOR THE SELECTIVE SKIMMING OF A LIGHT LIQUID LAYER ON A BODY OF WATER

[76] Inventors: Jean Le Foll, 14, avenue de l'Europe, 78160 Marly Le Roi; Henry Benaroya, 41, Boulevard du Commandant Charcot, 92200 Neuilly Sur Seine, both of France

[21] Appl. No.: 351,633

[22] Filed: Feb. 23, 1982

Related U.S. Application Data

[63] Continuation-in-part of Ser. No. 198,972, Jun. 3, 1980, abandoned.

[30] Foreign Application Priority Data

Oct. 3, 1978 [FR] France ................. 78 28254

[51] Int. Cl.³ .............................................. E02B 15/04
[52] U.S. Cl. ................................ 210/242.3; 210/923; 210/512.3
[58] Field of Search .................. 210/242.3, 923, 512.2; 114/274, 10

[56] References Cited

U.S. PATENT DOCUMENTS

| | | | |
|---|---|---|---|
| 3,656,619 | 4/1972 | Ryan et al. | 210/923 |
| 3,684,095 | 8/1972 | Ayers | 210/923 |
| 3,700,108 | 10/1972 | Richards | 210/242.3 |
| 3,708,070 | 1/1973 | Bell | 210/923 |
| 3,756,414 | 9/1974 | Crisafulli | 210/923 |
| 3,823,828 | 7/1974 | Derzhavets et al. | 210/242.3 |
| 3,831,756 | 8/1974 | Bhuta et al. | 210/242.3 |
| 3,915,864 | 10/1975 | Massei | 210/242.3 |
| 4,111,811 | 9/1978 | Fukuda et al. | 210/923 |
| 4,151,081 | 4/1979 | Bolli et al. | 210/923 |
| 4,178,247 | 12/1979 | Janson | 210/242.3 |

Primary Examiner—Charles N. Hart
Assistant Examiner—Sharon T. Cohen
Attorney, Agent, or Firm—John T. Synnestvedt; Richard D. Weber

[57] ABSTRACT

Apparatus for selectively removing a layer of light liquid such as oil from a body of water. The apparatus includes a floating hull having two lateral parts and a central part between the lateral parts forming ducts directing a flow of water and light liquid to separator means in the hull. Means are provided on the central part for creating vortices in the water flowing into the ducts which diminish the divergence of the flow at the water surfaces.

9 Claims, 15 Drawing Figures

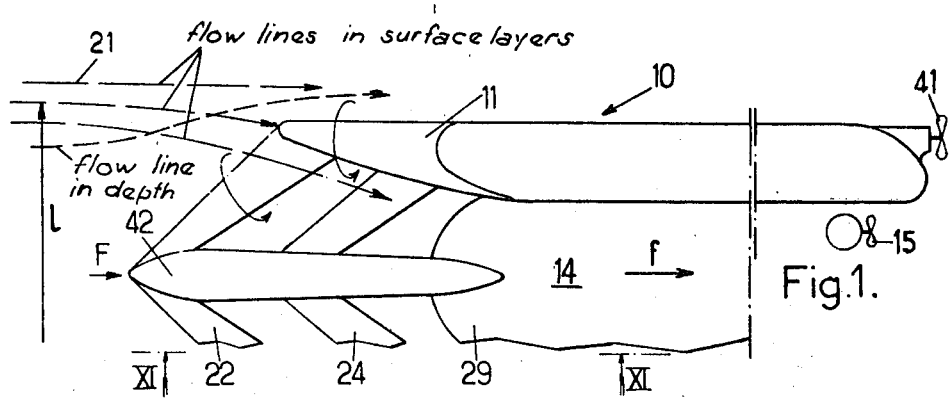
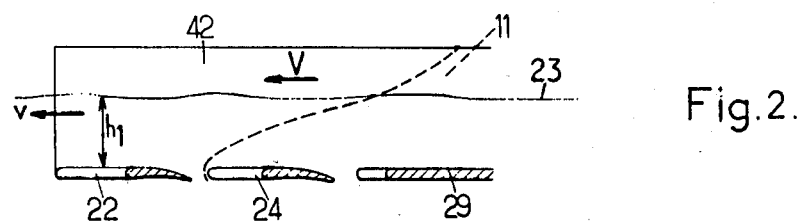
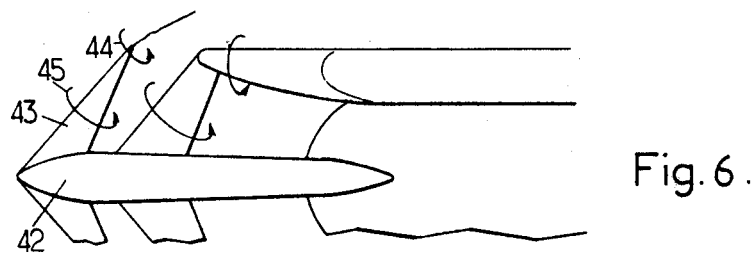
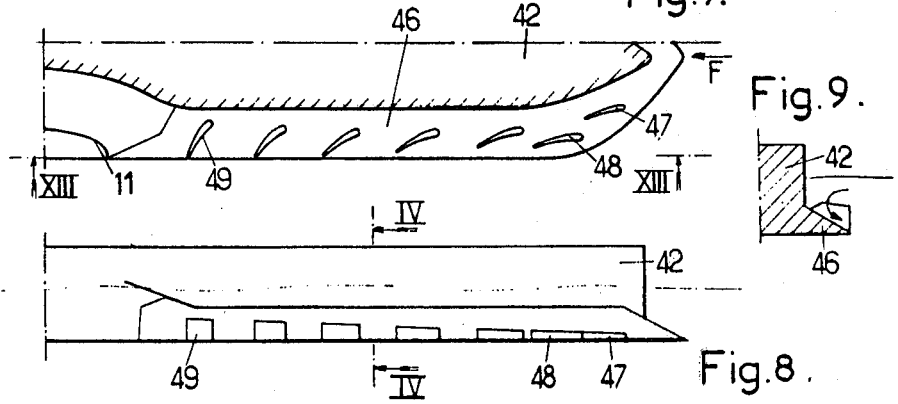
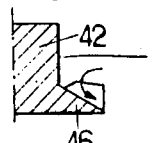

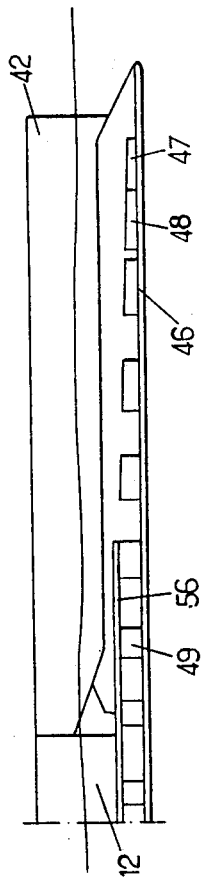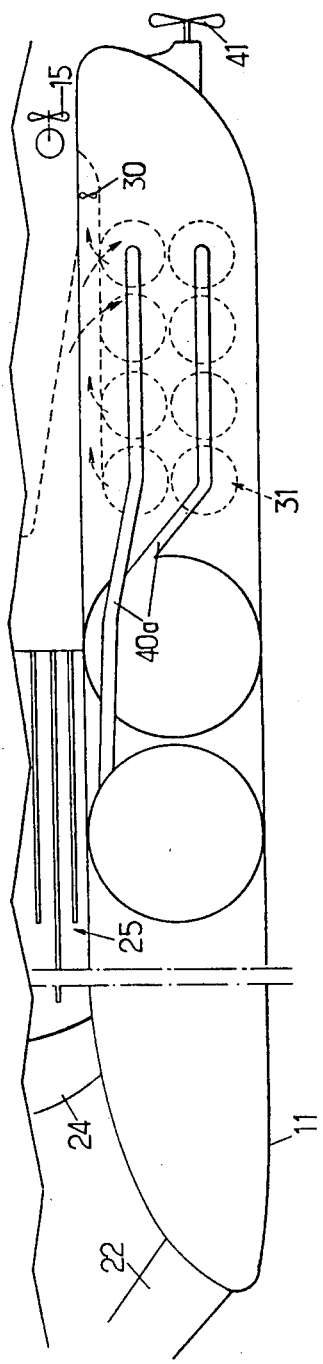

APPARATUS FOR THE SELECTIVE SKIMMING OF A LIGHT LIQUID LAYER ON A BODY OF WATER

CROSS REFERENCES TO RELATED APPLICATIONS

This application is a continuation-in-part of our prior copending application Ser. No. 198,972, filed June 3, 1980, now abandoned, resulting from International Application PCT/FR/ 79 00086 and claiming the benefit of our French Patent Application Ser. No. 78 28254 filed Oct. 3, 1978.

TECHNICAL FIELD AND PRIOR ART

The invention relates to an apparatus for selectively skimming a layer of a light liquid, particularly hydrocarbons, floating on the surface of a sheet of water and is of particular, although not exclusive, interest in the depollution of oil contaminated ocean areas, for example following an accident.

Numerous depollution techniques have already been proposed but none has proven practicable under the actual working conditions at sea. In particular, unit separators have been proposed using a vortex with a vertical axis. Such separators do not operate correctly in open water having a swell or waves with large troughs. A ship has also been proposed whose hull is divided, over a large portion of its length, into two parts separated from one another to form a basin whose rear end wall is provided with a take-up valve for drawing the surface layer of the body of water. Since there is rarely a well defined interface between the oil and water, in particular due to the roughness of the sea which remains appreciable even against the rear wall of the basin, either a huge volume of liquid as compared to the volume of oil that it contains should be drawn, or a small fraction of the total amount of pollutant is removed.

A prior art vessel for removing a floating contaminant liquid (U.S. Pat. No. 3,915,864 to MASSEI) has a central hull and two lateral hulls connected by the upper deck of the vessel. The hulls form an immersed inverted channel into which surface layers flow as the vessel advances. Fishbone ribs formed on that part of the central hull which constitutes the ceiling of the channel guide the liquid into accumulation zones.

Such ribs have an action on the contaminant water flow already trapped between the lateral hulls. A problem faced by such a vessel, as well as by vessels incorporating skimming beams (for instance, U.S. Pat. No. 3,831,756 to BHUTA et al) is as follows: since water must pass round the vessel as the latter advances, the effective width of the collected surface layer is considerably smaller than the width of the "mouth" of the vessel due to the divergence of the flow lines which begins well forward of the vessel.

It is an object of the invention to provide an apparatus for selective removal of floating contaminants capable of retaining the major part of the light liquid whilst drawing at the same time only an acceptable amount of water; it is another object to provide an apparatus adapted to operation in rough seas which is suitable for dealing with thicknesses of light liquid which can vary between about 1 mm and more than 10 cm.

It is an important object to provide an apparatus which is highly efficient in that it achieves depollution over a slice of water greater than feasible with prior appliances. It is a more specific object of the invention to decrease the tendency of the surface layers of the water body to diverge away from intakes for the pollutant as a reaction to the water displaced by the advancing vessel.

SUMMARY OF THE INVENTION

The concept which applicants have developed in this respect is a fundamental departure from prior art teachings. This concept involves an apparatus whose hull has a pair of generally parallel hull parts and a central part disposed between the hull side parts and extending ahead thereof in the direction of movement of the hull. The side parts and the central part of the hull therefore define flow ducts into which the water and the pollutant are directed for separating treatment. In order to diminish the tendency of the water and pollutant at the water surface to diverge outwardly during movement of the hull through the water, means are provided to establish a vortex movement of the water ahead of the ducts, which vortex will cause an outward and/or downward component of movement of the deeper water layer away from the central part and an inward component of movement of water and pollutant toward the central part at the surface. The means for producing such vortices comprise wings extending from the central part.

More precisely, the apparatus may comprise a hull provided with means for moving it in a predetermined direction through a body of water. The hull has two lateral parts and a central part placed between the lateral parts, projecting forwardly of the lateral parts in the predetermined direction. The central part carries deflector wings shaped for creating vortices in the water body whose orientation tends to diminish the divergence of the flow lines in the vicinity of the free water level ahead of said lateral parts due to movement of the apparatus, said lateral parts and central part cooperating to define ducts directing a flow of water and pollutant taken close to the water level to separator means in said hull.

According to another aspect, the apparatus has a floating hull and means for propelling said hull operable to maintain it at a flight speed from swell wherein said hull comprises two side parts and a central part protruding forwardly from the side parts and cooperating with the side parts to define two longitudinal water channels opening into separator means and said central part is formed with a lower bulge located under the free water level at a depth sufficient to be continuously immersed projecting laterally and forwardly given the crosssection of said central part of the waterline and provided with upwardly directed deflecting wings, said bulge and deflecting wings being arranged to create vortices having components reducing the divergence of the water flow in a layer close to the free water layer and the tendency of the water and light liquid layers close to the free level to flow round said hull.

In a particular embodiment, the central part is formed with a lower bulge located at a depth sufficient to be continuously immersed and provided with upwardly directed deflecting wings, said bulge and deflecting wings being arranged to create vortices having components reducing the divergence of the water flow in a layer close to the free water level.

The apparatus will typically be constituted by a vessel capable of reaching an operating zone from a harbour at high speed. It may however also be constituted by a half-immersed barge, even by a movable platform when the operation must be carried out in deep water.

The immersed parts of the lateral parts of the hull advantageously diverge forwards; the lateral parts may be connected, in their lower portion, by deflector wings tending to direct the deep layers of the flow between the lateral and central parts downwardly.

BRIEF DESCRIPTION OF THE DRAWINGS

The invention will be better understood from the following description of embodiments given by way of examples only. The description refers to the accompanying drawings, in which:

FIGS. 1 and 2 illustrate, respectively viewed from above and in side view, the general arrangement of part of a vessel according to a first embodiment of the invention;

FIG. 3 shows diagrammatically, a possible arrangement of the components in a lateral part of the hull, as seen from above;

FIG. 6, similar to FIG. 1, shows a modification thereof;

FIGS. 7, 8, and 9 are diagrams showing yet another embodiment of the front portion of the vessel, respectively viewed from above, in section along the line VIII—VIII and in section along IX—IX;

FIG. 10, similar to FIG. 8, illustrates a modification thereof;

DETAILED DESCRIPTION OF PREFERRED EMBODIMENTS

Figure 4:
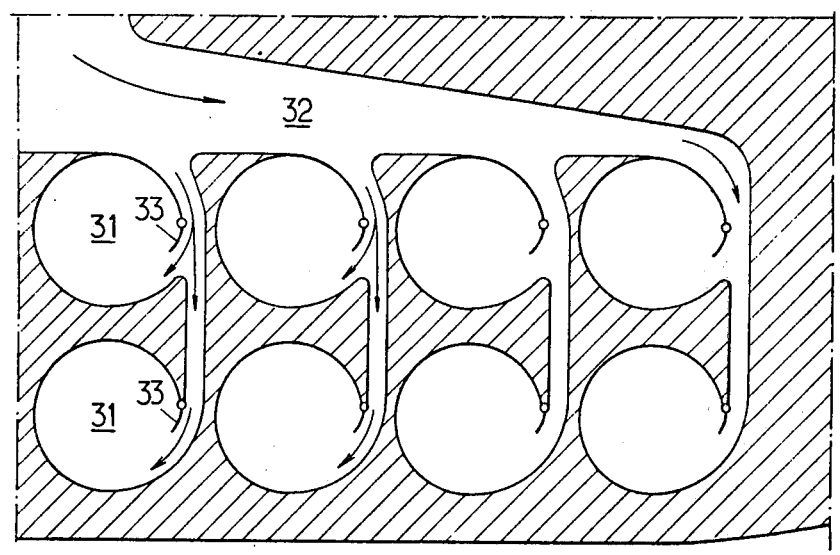
FIG. 4, similar to FIG. 3, shows diagrammatically a possible distribution of cyclone separators.

Referring to FIGS. 1 and 2, a depollution vessel has a hull 10 comprising two lateral parts 11 (only one of which is shown) and a central part 42. In operation, the vessel is maintained by propulsion means in flight speed v from a swell having a velocity V.

The sweeping of a polluted zone of the sheet of water requires circulation of a flow of water. That circulation occurs along a removal duct 14, locating circulating means such as propellers 15, ensuring a flow in the direction indicated by the arrow f. The propellers 15, which may be embodied in propeller units of the bulb type, cooperate with conventional propellers 41 for the propulsion of the appliance at speed v.

The pounding movements are always limited, especially when the appliance has a length greater than one wave length of the swell. The rolling will be slight considering that the vessel is in scudding attitude during working periods.

The polluting light liquid flow rate entering the channel, between the hulls, is equal to the product of the thickness of the polluting layer, which can vary widely, and the sea area actually swept per unit time. The first factor is imposed by the circumstances and it is only possible to modify the second factor, equal to the product of the speed of advance v of the appliance and the width l of the skimmed polluting layer, measured ahead of the appliance at a sufficient distance from the latter for the flow to be undisturbed there by the presence of the appliance. For a given speed v, there is therefore every advantage in increasing l. But the convergence of the flow lines in the surface layers cannot occur unless there is an attendant divergence in another dimension, which divergence must not result in escape of pollutant outside the processed flow.

The existence of windlashed or cross seas causes the level of the polluted layer to vary considerably and randomly, which necessitates trapping initially a water layer whose average thickness is much greater than the half-height of the swell. It is desirable to gradually discard the deeper portion of that trapped stream.

A first design feature increasing the effective skimming width as compared with the width of the hull consists of having a convergent intake. For that purpose the prows of the lateral parts are diverging, at least in the immersed parts thereof. The flow lines 21 limiting the trapped flow (FIG. 1) are thus rendered convergent. As mentioned above, the convergence of the flow lines at the surface is compensated by a contrary deflection of the deeper layer. For that purpose, there are provided deflector means whose action is essential. In the embodiment shown in FIGS. 1 and 2, the deflecting means comprise a first swept-back wing 22, extending from the bows of the lateral parts, immersed to a sufficient depth not to disturb the surface phenomena.

In that respect, the appearance of a transition irregularity between a torrential speed and a fluvial speed must be avoided. For fulfilling that object, the depth $h_1$ of wing 22 below the average water surface indicated at 23 must be such that the Froude number corresponding to the depth beneath the trough of the wave is less than unity.

The deflector means shown in FIGS. 1 and 2 includes a second wing 24, also in swept-back form, which maintains the progressive deflection. Other wings also may be positioned behind wing 24: the profiles will be selected for their hydrodynamical load to decrease progressively from the front to the rear.

The two lateral parts may be connected to the central part 42 by a platform positioned high enough to avoid pounding. Their bottom parts are connected by a permanently immersed structure comprising the wings 22 and 24.

In the embodiment of FIGS. 1 and 2, the central part 42 provided between the platform and the immersed structure extends over only a fraction of the length of the lateral parts. It cooperates with the lateral parts 11 and the deflector wings 22, 24 to deflect the deep layers downwards and correlatively to reduce the divergence of the flow at the surface. Reduction of the amount of divergence at sea level increases the width l over which the floating pollutant is trapped and the thickness of the pollutant layer at the intake of the skimming means.

Referring again to FIGS. 1 and 2, the lateral parts 11 protrude forwardly by an increasing extent from the point where their prows cut the waterline. The central part 42 projects forward of the lateral parts of the hull and thus a swept-back wing 22 may be used whose head is attached to the prow of the central part. The vortex flows thus obtained around the parts of the hull and the wings, shown diagrammatically by the arrows in FIG. 1, increase the skimming width.

Figure 5:
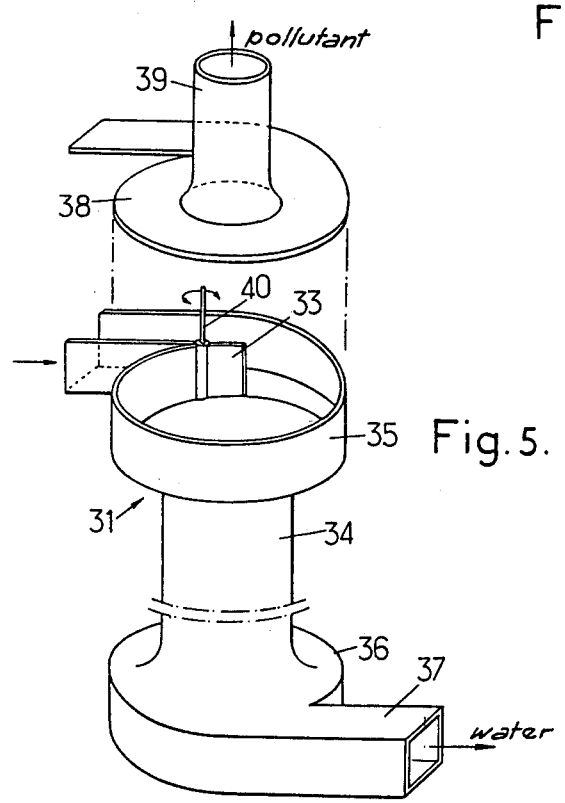
FIG. 5 is an isometric view of a possible constitution of a separator.

The stream taken by channel 14 and which is not discarded, for instance through a longitudinal bottom grid 25 (FIG. 3) is separated into a polluting mass of as small a volume as possible, which will be stored, and a purified water flow which will be returned to the ocean. In the embodiment of FIGS. 3–5, separation is effected by vertical axis cyclone-type separators. Such cyclone separators are already known, but hitherto they have been used under conditions incompatible with ocean operation and the nature of the pollution.

In order that the speed of sweeping the polluted area may be acceptable, it is indispensable to process a total flow rate of several tens of cubic meters per second. Even if the fraction rejected ahead of the intake to the separators is taken into account, the remaining flow could not be processed by a single cyclone separator or a pair of separators, unless they have an enormous diameter and an axial length incompatible with acceptable water-drafts. The problem is solved by providing several rows of separators, typically in two groups each placed in one of the lateral parts 11. These separators will occupy a considerable fraction of the horizontal area available, for example a third of the length, downstream of the intake.

FIG. 4 shows, by way of example, a possible distribution of separators 31, into two rows of four separators in each lateral part 11. The stream taken up by the inlet is directed to a channel which supplies several branches. Each branch supplies two separators 31, through a distributing flap 33 adjustable for balancing the flow rates.

Considering the kinetic energy brought into action due to the high tangential speed, it is desirable to recover therefrom the largest part possible, for example to participate in the propulsion. For this purpose, it is possible to design each separator as shown diagrammatically in FIG. 5. The separator 31 shown in FIG. 5 comprises a vertical tube 34 provided at its upper part with a rotation-imparting volute 35, fed by the flap 33, and at its lower part, a diffuser 36 provided with a depolluted water discharge duct 37. The top volute 35 is provided with a cover 38 comprising a central chimney 39 through which the pollutant is aspirated. The flap 33 may be provided with a shaft 40 passing through the cover 38 and controlled by an orienting lever system (not shown).

The fluid flow taken through the chimneys 39 will include a considerable proportion of pollutant, sometimes highly emulsified. When this pollutant is constituted by certain qualities of crude oil, the flow will have a very high viscosity, in particular at the temperature of sea water. Pumping by conventional mechanical means could be extremely difficult. This problem is solved according to one aspect of the invention by pumping the flow to storage tanks (which may be placed in the forepart of the hull) by steam jets which, at the same time, heat the pollutant (advantageously by some ten degrees) thereby decreasing the viscosity and supply the necessary amount of motive force. A simple circulation shows that it suffices for the ratio between the flow of steam and the flow of liquid to be moved to be of about 1/100.

The final storage tanks may be designed for subsequent separation by decantation. Decantation is facilitated by keeping the fluid body in slow rotation. Consequently, revolving tanks will generally be used with peripheral injection of the flow taken up by the chimneys 39.

The orders of magnitude of the various operating parameters may be those given below, in the case of a vessel designed to operate in rough seas with wave heights 2 H of up to four meters. Such a swell is frequently encountered on the Atlantic coasts, with a period of about eight seconds and a wave-length in deep water of 80 m.

The shape of the poops of each of the lateral parts of the hull will be such that the water moved by the propellors 41, revolving backwards to retain the appliance or to depolute at low speed, does not disturb the ambient medium; for example, the poops will be shaped to deflect the ejected water downwardly in depth.

The vessel may then comprise two lateral hulls of 81 m in length and 12 m in width. The stem shape is such that the skimming width is about 40 m. The water draught will be about 8 m.

The propellors 15 may be driven by motors placed in the hull. They participate in the propulsion of the ship along with the main engines for driving the propellors 41 (used alone during the journey to the operating area and usable to orient the appliance), as well as discharge propellors 30 for the water coming from the manifolds 37. The polluting mass taken up by the chimneys 29 will be brought, through ducts 40a, to tanks placed in the hulls forward of the separators 31.

Numerous modifications may obviously be introduced into the embodiments described above. In addition, to improve the seaworthiness of the ship outside of operating periods, a false stem may be provided which is foldable forwards, but allows however a flow of water to pass to supply the propellors 15. However, the appliance may be constituted by a simple section capable of being coupled to a conventional ship.

The appliance may be of extremely variable length. The speed of advance in operation will generally be different depending whether it is of relatively small size (less than 30 m for example) or of large tonnage.

In the first case, it will often be advantageous to operate at a speed close to that of the swell, or even equal if possible: then swell damping takes place almost automatically considering steady conditions exist forward of the appliance.

The same effect as in FIGS. 1 and 2 may be obtained by using the property of free-ended wings to generate free vortices which induce, in the wake of the wing and over great distances, a speed which is superimposed to the relative speed vector of the undisturbed flow. In the embodiment shown diagrammatically in FIG. 6, the forward wing 43 gives rise in the liquid body to a free vortex 44 extending a virtual vortex 45 bound to the wing, with the same circulation, starting from the central part 42.

If straight wings are used, the bound vortices are approximately perpendicular to the plane of symmetry and only induce transverse components of low speed. It is therefore advantageous to use highly swept-back wings 43 which create bound vortices 45 having a sweep-back close to that of the leading edge of the wing, hence large longitudinal components whose useful action is added to that of the free vortices 44.

The object is not to obtain a lift force, but vortices whose axis has a component directed longitudinally. Hence, it is not necessary for the lifting forces to be vertical: the planes of the wings can hence be oblique or even vertical if a suitable support is available to secure the root of the wing.

FIGS. 7 to 9 show a central part 42 which comprises for that purpose a lower bulge or flat wing 46. A plurality of practically vertical wings 47,48, . . .,49 project upwardly from the bulge 46 which constitutes a forward floor of the lateral parts such as 12 and may be designed to constitute a deflector.

In the case, the flow above the edge of floor 46 has a lateral speed component directed outwardly. If the flow under the floor 46 has a smaller lateral speed component, a reverse vortex appears at the junction of the two flows, either in the form of a virtual vortex at the inside of the edge of the floor, or in the form of an actual sheet of vortices escaping from said edge. This effect may be avoided by inclining the whole of the floor 46 upwards and forward: it then behaves like a wing with a positive angle of attack and the flow diverges beneath the lower surface. It is also possible to cause the flow beneath the floor 46 to diverge laterally by providing vertical wings positioned beneath the floor. Such wings substitute part or whole of the reverse vortex of the edge with opposing vortices starting from the tip of the wings, the downwards movement of all or part of the opposing vortices having a favorable effect in the layers close to the free surface. Part of the intensity of the bound vortex corresponding to each wing 47, 48, 49 is propagated inwardly of the edge of the floor 46 and compensates for the intensity of possible reverse vortices. The residual intensity is propagated to the core of the central part 42, whence a general acceleration of the flow above the floor, which decreases the bow wave of the central part.

Excessive motion of the water with respect to the immersed deflecting wings, due to pitching, will generally be avoided by a sufficient value of at least the forward section of the central part 42 at the waterline.

If the bulge 46 forming a floor carries a plurality of substantially vertical wings projecting upwards, the upper ends of part of the wings may be connected mechanically together by an immersed plate which is horizontal or slightly inclined, which covers all or part of the ends of these wings and which can overlap on the side of the leading edges. The floor, wings and plate constitute a box. The inclination of the trailing edges of the wings with respect to the plane of symmetry of the appliance generates a flow with a strong transverse component between the wings. The flow subsists if the caisson extends rearwardly under the forwardly located portion of the associated lateral part as indicated in FIG. 10 where the same reference numerals as in FIGS. 7-9 are used for designating corresponding parts. Then there is a progressive removal of the lower layers of the stream occuring between the central part 42 and the lateral parts 11. There is a correlative increase of the pollutant content of the upper liquid layers. In FIG. 10, the last three wings have their upper ends connected with a plate 56.

Figure 11:
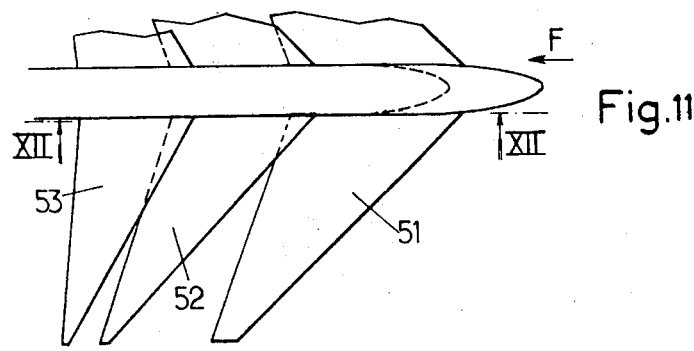
FIGS. 11, 12 and 13 are diagrams representing yet another embodiment, respectively viewed from above, from the line XI—XI of FIG. 12, in elevation, and in section along the line XIII—XIII (the flow still being in the direction of the arrow F)
Figures 12, 13:
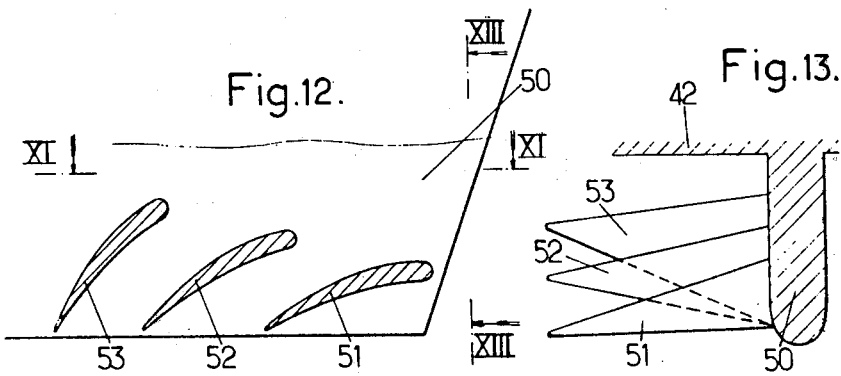

Useful marginal vortices can also be developed by wings which are fixed on a narrow central keel placed beneath bulge 46 or vertically under the bottom wall. The influence of such vortices close to the surface is however limited by their great depth of immersion and by the opposing bound vortices that they develop inside the bulge 46. Referring to FIGS. 11-13, the lower bulge of the central hull 42 is extended by a keel 50 bearing swept-back deflecting wings 51, 52 and 53. The divergence of the flow in the surface layers due to water flow round the appliance may also be reduced by inducing water flow under the hull in the zone close to the plane of symmetry, at the expense of flow around the hull.

Figure 14:
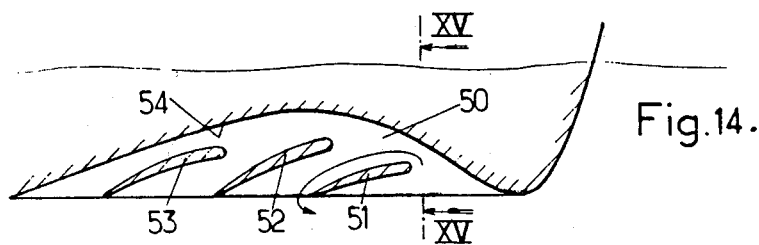
FIGS. 14 and 15 are diagrams showing yet another modification, respectively in section along the line XIV—XIV and XV—XV.
Figure 15:
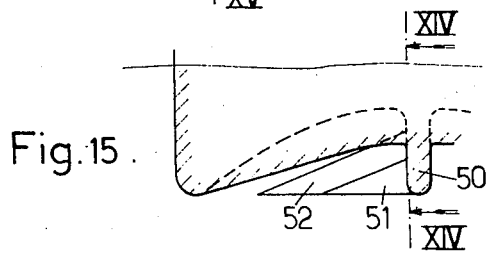

For that purpose, the lower surface of the bulge 46 may be recessed. That feature may be combined with deflector wings of the type already shown in FIGS. 11-13. The resulting shape is as shown diagrammatically in FIGS. 14-15, wherein the members corresponding to those of FIGS. 11-13 are denoted by the same reference numerals. The recess 54 again tends to induce flow underneath the central part at the expense of lateral flow.

We claim:
1. Apparatus for removing floating liquid pollutants from a body of water, comprising: a hull provided with means for moving it in a predetermined direction through the body of water and having two lateral parts, and a vertical central part, placed between the lateral parts, projecting forwards with respect to the latter in said predetermined direction and bearing immersed deflector wings part at least of which is located forward of the lateral parts, said wings being shaped for creating vortices in the water body, the orientation of said vortices tending to diminish the divergence of the flow lines in the vicinity of free water level ahead of said lateral parts due to movement of the apparatus, said lateral parts and central part cooperating to define ducts directing a flow of water and pollutant taken close to the water level to separator means in said hull.

2. An apparatus for selectively removing a layer of light liquid on a water body, having a floating hull and means for propelling said hull operable to maintain it at a flight speed from swell wherein said hull comprises two side parts and a central part protruding forwardly from the side parts and cooperating with the side parts to define two longitudinal water channels opening into separator means and said central part is formed with a lower bulge located under the free water level at a depth sufficient to be continuously immersed, projecting laterally and forwardly from the cross-section of said central part at the waterline and provided with upwardly directed deflecting wings, said bulge and deflecting wings being arranged to create vortices having components reducing the divergence of the water flow in a layer close to the free water layer and the tendency of the water and light liquid layer close to the free level to flow round said hull.

3. Apparatus according to claim 2, wherein the transversal distance between the side parts increases forwardly from the intake of said channels.

4. Apparatus according to claim 2 or 3, further comprising substantially horizontal wall means immersed at a depth higher than the maximum height of the swell and connecting said side parts and said central part.

5. Apparatus according to claim 2, wherein said separator means comprise at least one row of a plurality of vertical centrifugal separators in each said side part.

6. Apparatus according to claim 5, wherein those of said centrifugal separators which are located in the same side part are each provided with cylindrical distributor means, all said distributor means being supplied in parallel flow relation by a bi-dimensional manifold through a valve, and with an energy recovery diffuser located at the lower part of the separator, all diffusers being connected to a same exhaust system provided with water ejection means.

7. Apparatus according to claim 6, wherein each said separator is provided with means for selectively directing a fraction containing the liquid to storage containers.

8. Apparatus according to claim 7, wherein said directing means comprise steam jet ejectors located on a flow path from a pollutant-enriched outlet of said separators to said storage containers received in said lateral parts.

9. Apparatus for selectively removing a layer of light liquid from a body of water, said apparatus comprising a hull, means for moving said hull in a predetermined direction through a body of water, said hull comprising two lateral parts and a vertical central part disposed between said lateral parts, said central part extending forwardly of said lateral parts in said predetermined direction, said lateral parts and said central part cooperating to define therebetween ducts directing a flow of water and light liquid to separator means in said hull, and means located under the free water level for creating vortices in the water flow ahead of said ducts and producing a transverse water flow component toward said central part adjacent the free surface and away from said central part substantially below said surface, said latter means comprising deflector wings carried by said central part and at a depth sufficient to be permanently beneath the free water level.

* * * * *